Figure 1:
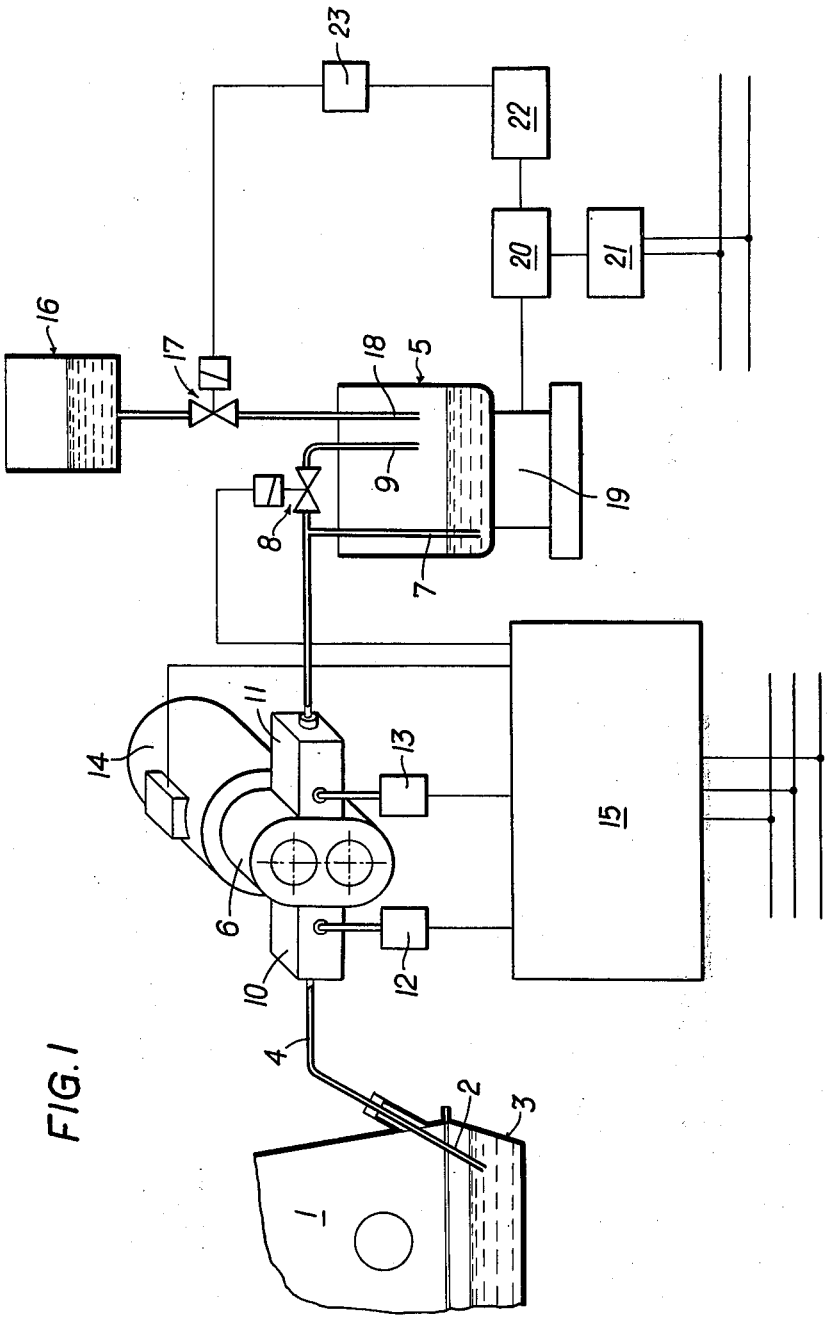

United States Patent [19]
Schreiber

[11] 3,908,450
[45] Sept. 30, 1975

[54] DEVICE FOR THE DETERMINATION OF LIQUID CONSUMPTION

[75] Inventor: Erich Schreiber, Graz, Austria

[73] Assignee: Hans List, Graz, Austria

[22] Filed: Sept. 10, 1974

[21] Appl. No.: 504,762

[30] Foreign Application Priority Data
Mar. 15, 1974  Austria .................... 2176/74

[52] U.S. Cl. .................................................. 73/113
[51] Int. Cl.² ............................................ G01F 9/00
[58] Field of Search .................... 73/113, 116, 118

[56] References Cited
UNITED STATES PATENTS
2,669,869  2/1954  Weber .............................. 73/113
3,105,565  10/1963  Pischinger ...................... 73/113 X

*Primary Examiner*—Jerry W. Myracle
*Attorney, Agent, or Firm*—Watson, Cole, Grindle & Watson

[57] ABSTRACT

A device for measuring the consumption of liquids from a sampling container, comprising a pump with a reversible delivery direction inserted in a connecting line between the sampling container and a measuring vessel supported by means of a weighing device, a filling pipe fed from a reserve tank and terminating in the measuring vessel, and a solenoid valve inserted in the filling pipe and controlled by means of a comparator impinged upon with the measured value of the weighing device and a reference value which can be preset by means of a control mechanism.

6 Claims, 2 Drawing Figures

DEVICE FOR THE DETERMINATION OF LIQUID CONSUMPTION

The present invention relates to a device for the determination of the consumption of liquids from a sampling container, in particular of the lubricant or fuel consumption of an internal combustion engine, comprising a measuring tank supplied with the fuel by means of a pump and a weighing appliance carrying the measuring tank.

A variety of methods for the measurement of the lubricant consumption of internal combustion engines are known to exist, some of which are extensively used in actual practice without, however, fully meeting the requirements of up-to-date research and development standards.

According to one of the conventional methods the oil contained in the oil sump of the engine is removed before and after a test run, whereupon the difference in weight between the quantities drawn off is determined. Since it is necessary to ascertain the difference between comparatively large quantities of oil, satisfactory results can be expected from large-scale consumption, that is from test runs of a certain duration. Morover, the drainage of lubricating oil sumps is tiresome and Moreover, and a handicap for the smooth continuation of test runs.

According to another known method the lubricant consumed is replenished before a test run and after up to a predetermined level identified by a mark on the oil gauge rod. However, results of adequate precision are obtainable only if the draining operation is constantly repeated accurately for the same period of time and if they are determined as the mean value of a number of measuring tests of a certain duration.

Another known method of determining the lubricant consumption is the attachment of an inclined oil gauge glass to the oil sump. It should be noted, however, that because of pressure and level fluctuations in the oil sump the oil level in the oil gauge glass is generally in slow motion while the engine is running, so that accurate readings are difficult to obtain. Moreover, automatic recording of the oil consumption is hardly practicable with this method.

Other known arrangements provide for a closed vessel communicating with the oil sump and connected with the oil contained therein and with the oil-free space of the crankcase by means of flexible pipes, and standing upon a balance. However, level differences are responsible for slow fluctuations of the lubricant between the oil sump and the weighing vessel rendering readings with the engine running difficult, particularly in such cases where the elastic suspension of the engine is liable to comparatively important deflections of the oscillation during a test run.

Finally, a further system has been disclosed wherein a balance carries an oil reserve vessel from which a small-sized pump continuously delivers oil to the oil sump, said oil - reduced by the quantity consumed in the process - flowing back to the reserve vessel on the balance via an overflow pipe rigidly connected with the oil sump. This requires the use of an especially equipped oil sump. The quantity blown through emerges from the crankcase not in the normal way but through the overflow pipe. In the event of the engine being subject to irregular vibrations of the kind initiated by irregular fuel injections into individual cylinders, the overflow pipe will not discharge continuous quantities into the reserve vessel on the balance, thereby producing fluctuating indications. Consequently the precision of measurements effected according to this known methods calls for certain improvements in the light of present-day criteria.

It is the purpose of the present invention to provide a consumption measuring device of the type hereabove described, avoiding the afore-mentioned drawbacks of known arrangements and distinguishing itself not only by a higher degree of the precision of measurements but also by a particularly simple operation exempt from individual sources of error. Therefore, according to the invention a self-priming pump with a reversible direction of delivery is provided and inserted in a connecting pipe protruding in the manner of a probe from the top with each of the open ends into the sampling container and the measuring vessel, and a filling pipe fed from a reserve tank protrudes into the measuring vessel, said filling pipe being controlled by means of a comparator impinged upon by the measuring value of the balancing device and by a reference value preset on a control gear and corresponding to a rated weight of the liquid in the measuring vessel.

This consumption measuring device is suitable for fully automatic, if necessary programmed measuring operations and distinguishes itself by the accuracy of the consumption figures obtainable even under difficult conditions. Another essential advantage of the device according to the invention resides in the fact that no alteration of design of the engine used is required and in particular, it does not call for the attachment of any additional appliances whatever. According to the measuring principle applied, the liquid is drawn off from the sampling container, which in the case of measurements of the oil consumption of an internal combustion engine is the crankcase of same, and delivered to the measuring vessel until such time when the extremity of the connecting pipe forming the sampling probe emerges from the liquid level. Now the comparator compares the weight of the quantity of liquid delivered to the measuring vessel with the reference value setting of the control appliance, corresponding to a certain rated weight of the liquid. If these two values differ from each other, the filling line fed from the reserve tank is kept open by the comparator and the measuring vessel replenished with liquid until such time when the recording of the weighing device tallies with the reference value of the rated weight. Upon completion of the replenishing operation, the quantity of liquid which is identical with the quantity consumed by the engine, is registered. In response to a control signal of the control gear, the liquid contained in the measuring vessel is returned to the sampling tank, such as the oil sump, by means of the pump now delivering in the opposite direction, the process being completed with the emergence of the extremity of the connecting line protruding into the measuring vessel. The quantity of fuel returned upon completion of each measuring operation being constant, the former liquid level is re-established in the sampling tank, thus restoring the same initial condition for the next measuring operation as had prevailed for the preceding one. These permanently identical conditions make for measuring results of extreme precision.

According to a preferred embodiment of the invention the switching on of the pump and the direction of its delivery are controlled automatically by means of the control gear. As a result, the operator in charge of the test program is dispensed from any manual operation of the measuring device and can thus dedicate himself fully to the remaining tasks of the test.

According to the invention it is particularly advantageous if the two delivery apertures of the pump are each preceded by a control and safety valve actuated by the delivery pressure for the purpose of stopping the operation of the pump upon termination of the liquid delivery in each of the suction-ends of the connecting line. As a result, the pump is arrested after the liquid level has dropped both in the sampling tank and in the measuring vessel below the level determined by the open ends of the connecting pipe, that is when air is admitted to the connecting pipe so as to prevent it from idling.

In order to achieve this automatic switch-off of the pump in both directions of delivery, according to another feature of the invention the control and safety valve comprises an outer valve body extending in a longitudinal bore of the valve casing and springloaded against a stop in the direction of the delivery aperture of the pump, and an essentially hollow-cylindrical inner valve body slidable in an axial bore of said valve casing. One of the extremities of said inner valve body facing the delivery aperture and closed with the exception of an aperture for the passage of air co-operates with a stop which is cast integral with the casing and has radial overflow apertures in the vicinity of this extremity. The space between the valve bodies and the delivery apertures can be connected with a liquid pressure switch arresting the operation of the pump if the liquid pressure drops below a predetermined value. On the one hand, such a valve arrangement assures the unimpaired passage of the liquid through the overflow apertures of the raised inner valve body of the suction-end control-and-safety valve for the delivery aperture of the pump, and on the other hand, it prevents the build-up of an excessively high pressure in the delivery-end control-and-safety valve where the overflow apertures of the inner valve body in its closing position are closed and the liquid is allowed to flow through the air passage aperture exclusively. In fact, as soon as the minimum pressure of response of the liquid pressure switch has been attained and the pressure switch closes, any further rise of pressure results in a displacement of the valve body against the action of a spring so that the overflow apertures of the inner valve body are exposed. If, however, the cessation of the liquid delivery allows air to reach the delivery end of the pump, the same can easily escape through the air passage aperture of the inner valve body of the delivery-end control-and-safety valve. This is accompanied by a sudden pressure drop which is sufficient to switch off the pressure switch which in turn leads to the switchoff of the pump operation.

According to the invention the pressure switches of the two control-and-safety valves are advantageously located within the exciter circuit of a relay included in the control gear and associated with the engine circuit of the pump. The automatic switchoff of the pump upon the termination of the liquid delivery in the connecting pipe is thus assured for both delivery directions in a simple manner.

In order to assure an accurate recurrence of the quantity of liquid removed by suction even if the liquid level in the sampling container fluctuates periodically or presents surface waves, according to a further embodiment of the invention, the control gear comprises an adjustable time switch for the purpose of delaying the stoppage of the pump operation by the pressure switches. In actual practice a delay of about a half-minute to a full minute has proved most convenient. During this intervall of time the pump predominantly draws off air but also liquid from the agitated surface of the liquid level in the sampling container until such time when even the highest wave crests of the liquid level are unable to attain the mouth of the sampling probe. As a result, a very accurately measured constant quantity of liquid remains in the sampling container even under these particularly difficult conditions.

The last-mentioned arrangement can be further improved according to another feature of the invention by the provision of a branch line branching off the connecting line, controlled by a solenoid valve and terminating in the measuring vessel at a point above the liquid level, said branch line being open during the retarding period of the time-switch. This is to prevent a substantial amount of air from being blown into the liquid during that period of time during which air is mainly delivered from the sampling container into the measuring vessel, the liquid being spattered and additionally oxydized if the liquid in question is oil.

Figure 2:
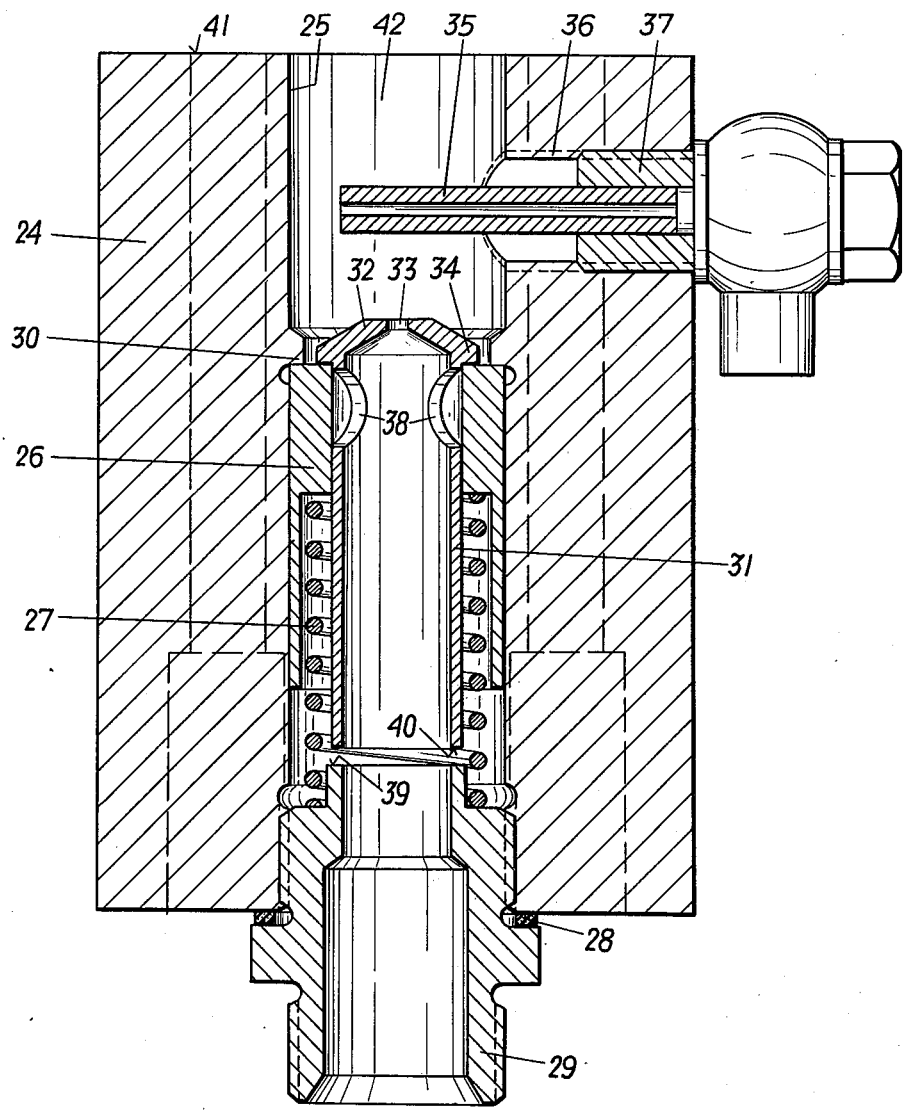

Further details of the invention will become apparent from the following description of an embodiment of the invention with reference to the accompanying drawing in which FIG. 1 is a schematic overall view of the consumption measuring device according to the invention for determining the lubricating-oil consumption of an internal combustion engine and FIG. 2 is an axial cross-sectional view of a design detail of this device.

In the gauge-rod aperture of the internal combustion engine 1 only partly shown in the drawing, whose oil consumption is to be determined in the course of one or several test runs, a pipe is inserted serving as a sampling probe 2 and fixed in such a manner that the mouth of the pipe is located a few millimeters below the oil level in the oil sump 3. The sampling probe 2 forms one extremity of a connecting pipe 4 leading to a measuring vessel 5 and wherein a self-priming pump with a reversible direction of delivery, in the present instance a gear-type oil pump 6 is inserted. The other extremity 7 of the connecting pipe 4 is also designed as a probe protruding into the measuring vessel 5 from above. From the connecting pipe 4 emerges also a branch pipe 9 controllable by means of a solenoid valve 8 and likewise terminating in the measuring vessel 5 but a greater distance from the bottom of the measuring vessel 5 than the probe 7.

Located in front of each of the two delivery apertures of the pump 6 is a control-and-safety valve 10 and 11 respectively, each of the latter being associated with an oil pressure switch 12 nd 13, respectively. The oil pressure switches 12, 13, the electric driving motor 14 of the pump 6 and the solenoid valve 8 are connected to a central control gear 15 by means of one connecting line each.

Furthermore, an additional pipe 18 fed from an elevated oil reserve tank 16 and controllable by means of a solenoid valve 17 protrudes into the measuring vessel 5 and terminates preferably at about the same level as the branch pipe 9 above the oil level in the measuring vessel 5.

The measuring vessel 5 is supported by means of a weighing device 19 recording an electric measured value, such as a load-measuring photocell. The output signal of this weighing device 19 is delivered to a carrier-frequency amplifier 20 whose operating voltage is supplied by a measuring appliance 21. Connected to the output of the carrier-frequency amplifier is a comparator 22 controlling the solenoid valve 17 of the filling pipe 18 via an adjustable time-delay member 23.

The operation of the oil consumption measuring device illustrated in the drawing is as follows: Prior to the start of the internal combustion engine 1 a predetermined amount of oil is contained in the oil sump 3. During the test run a certain quantity of oil from the oil sump 3 is consumed by the engine 1. This amount of oil is to be ascertained and recorded by means of the measuring device. For that purpose, the driving motor 14 of the gear-type oil pump 6 is switched on and oil is syphoned off by the sampling probe 2 and delivered to the measuring vessel 5 through the connecting pipe 4 until such time when the oil level in the oil sump 3 has dropped to such an extent that the mouth of the probe 2 emerges. If the engine is running without vibrations and the oil level in the oil sump 3 is essentially calm, oil is delivered to the measuring vessel 5 through the probe 7 only, the branch pipe 9 remaining closed.

When the oil supply ceases as a result of the emergence of the probec 2 from the oil level, the driving engine of the pump 6 is arrested as will be explained in greater detail hereafter with reference to FIG. 2. The comparator 22 now compares the value measured by the weighing appliance 19 and corresponding to the weight of the oil in the measuring vessel 5 with a reference value preset at the control gear 15 and corresponding to a certain rated value. If the measured value recorded by the weighing appliance 19 is smaller than the reference value corresponding to the rated weight, the solenoid valve 17 will be opened by the comparator 22 and the measuring vessel 5 replenished from out of the reserve tank 16 through the filling line 18. This replenishing operation is terminated as soon as the two values compared by the comparator 22 tally. At this very moment the solenoid valve 17 is closed. The replenished quantity of oil equals the amount of oil consumed by the engine 1 during the preceding test run.

Upon completion of the replenishing operation and after the amount of the refill has been duly recorded, the driving motor 14 of the oil pump 6 is switched on in the opposite direction of rotation via a signal from the control gear 15. Now the pump 6 delivers oil from the measuring vessel 5 through the connecting pipe 4 back into the oil sump 3 until such time when the mouth of the probe 7 emerges from the oil level of the measuring vessel and begins to draw in air. As a result, a constant quantity of oil depending upon the setting of the rated value on the control gear 15 exclusively, is returned from the measuring vessel 5 to the oil sump 3, so that the same oil level will appear in the oil sump time and time again upon completion of every measuring and refilling operation. Thus the same initial conditions as had applied to the preceding measurement will prevail also for the next measuring operation.

In order to make sure that the driving motor 14 of the pump is stopped independently from the direction of its rotation every time when air is drawn into the connecting pipe 4 as a result of the emergence of the probe 2 or 7, the two control-and-safety valves 10, 11 already mentioned above whose design is illustrated in FIG. 2, are provided.

Each of the two valves comprises a housing 24 with a stepped-down axial bore 25 wherein an essentially tubular outer valve body 26 is slidable in an axial direction. A pressure spring 27, supported by a connecting fitting 29 screwed in a threaded section of the bore 25 with the interposition of a packing 28, forces the outer valve body 26 against a stop 30 provided in the bore 25. In the bore of the outer valve body 26 an axially freely movable hollow-cylindrical inner valve body is guided, whose one extremity 32 facing away from the connecting fitting 29 is closed with the exception of a central aperture 33 for the passage of air. The inner valve body 31 rests with a collar 34 upon the front end of the outer valve body 26. The extremity 32 of the valve body 31 co-operates with a stop cast integral with the housing in the shape of a tube 35 inserted in a connecting fitting 37 screwed into a transverse taphole 36 of the housing 24. From this connecting fitting 37 a line leads to the associated oil pressure switches 12 and 13, respectively.

In the vicinity of its extremity 32 the inner valve body 31 presents radial overflow apertures 38 which in the position of the two valve bodies shown in the drawing are closed by the bore of the outer valve body 26. The opposite open extremity 39 of the inner valve body 31 co-operates with a stop 40 cast integral with the housing and formed by the connecting fitting 29.

The two control-and-safety valves 10 and 11 are arranged on the pump 6 in such a manner that the side of the valve designated by reference number 41 faces one each of the two delivery apertures of the pump 6. The chamber of the valve housing 24 located between the two valve bodies 25, 31 and the delivery aperture is designated by reference number 42.

Referring to FIG. 1, the functions of the two control-and-safety valves 10 and 11 are as follows: As long as oil is drawn off the oil sump 3, the inner valve body 31 of the control-and-safety valve 10 located at the suction end in this instance occupies the end position determined by the pipe 35. The oil drawn in through the connecting pipe 4 flows almost unimpeded towards the pump 6 via the exposed overflow apertures 38 of the inner valve body 31. As a result of the low pressure prevailing in the housing chamber 42 the associated oil pressure switch 12 remains unaffected.

In the control-and-safety valve 11 located at the delivery end with this direction of delivery, pressure rises at the beginning of the delivery process, placing the inner valve body 31 into the closing position illustrated in FIG. 2. Since the inflowing oil is only allowed to flow through the relatively small air passage aperture 33, a pressure is building up in the housing chamber 42, impinging through pipe 35 also upon the associated oil-pressure switch 13 which closes as soon as its minimum pressure of response has been reached. As the pressure in the housing chamber 42 increases further, the outer valve body 26 is displaced against the action of the pressure spring 27. At the same time the open extremity 39 of the inner valve body 31 is moved as far as the stop 40 which is cast integral with the housing. However, the outer valve body 26 continues to move, thereby exposing the overflow aperture 38 of the inner valve body 31, so that oil is now allowed to flow through a larger cross-sectional area and the build-up of an inadmissibly high pressure in the chamber 42 is precluded.

If the suction operation to remove oil from the oil sump 3 is completed because of the emergence of the mouth of the probe 2, so that thereafter only air is drawn in almost exclusively, the pressure of the oil at the delivery end of the pump, within the control-and-safety valve 11 that is, drops considerably because the air now supplied is allowed to escape easily through the small aperture 33 of the inner valve body 31. This drop of pressure is sufficient for the switchoff of the oil pressure switch 13 in order to arrest the driving motor 14 of the pump 6 via a suitable relay switch or the like which need not be described in greater detail.

Identical conditions result from the return of oil from the measuring vessel 5 to the oil sump 3, in which case merely the operation of the valves 10 and 11 is permuted as compared with the behavior as hereabove described.

In order to achieve correct measuring results even in such cases where the oil level in the oil sump 3 is agitated with the engine 1 running or presents surface waves, the stop signal released by the oil pressure switch 13 for the driving motor of the pump 6 can be delayed by a selective interval of time, preferably by a half-minute or full minute. For that purpose, a time-shifting section can be inserted in the affected circuit of the control gear 15. Since when the surface of the oil level in the oil sump 3 is agitated, predominantly air, but also minor quantities of oil are delivered until such time when even the highest wave crests of the oil level can no longer attain the mouth of the probe 2, the solenoid valve 8 is opened by means of a pulse released by the control gear 15 and the branch line 9 is exposed so as to prevent an considerable quantity of air from being blown into the oil contained in the measuring vessel 5, and the oil being spattered or additionally oxydized. As a result of these proceedings a very accurately measured constant amount of oil is sure to remain in the oil sump 3 upon completion of the suction process even if the oil level in the oil sump 3 is very much agitated. If the oil level is calm, the driving motor 14 of the pump can be arrested immediately upon the first entry of drawn-in air in the valves 10 and 11, respectively, without thereby impairing the recurrence of the measurements.

According to another embodiment of the invention not illustrated in the drawing, however, a clock is incorporated in the control gear 15 for the purpose of timing the recurrence of the measuring cycle and for the preselection of an uninterrupted sequence of measuring cycles at selective intervals of time, thereby permitting the permanent monitoring of the oil consumption during extensive test runs. In addition to accurate periodic oil consumption measurements, the device according to the invention can be used advantageously for the periodic refilling of the oil level to a very accurately constant level, the maintenance of which is important for certain oil consumption investigations as well as for the regular monitoring and replenishment of the oil level at brief intervals on automatically controlled engine test benches.

The refill quantities recorded at regular intervals by the weighing appliance 19 can be recorded as required and/or delivered to a data processing installation.

I claim:

1. A device for measuring the consumption of liquid from a sampling container, in particular of the lubricant or fuel consumption of an internal combustion engine, comprising a measuring vessel, an electric weighing device carrying said measuring vessel, a self-priming hydraulic pump having a reversible delivery direction and comprising two delivery apertures, two connecting lines, each of them emerging from one of said delivery apertures and having an open extremity, the open extremity of one of the two connecting lines protruding from above into said sampling container, the open extremity of the other connecting line protruding from above into said measuring vessel, a reserve tank located above the measuring vessel, a filling pipe emerging from said reserve tank and having an open extremity protruding from above into said measuring vessel, a solenoid valve inserted in said filling pipe, a carrier-frequency amplifier connected to the output of said weighing device, a voltage comparator with two inputs and one output, the first input of the voltage comparator being connected with the output of said carrier-frequency amplifier, the output of the voltage comparator being connected with said solenoid valve via an interposed time delay member, and a control mechanism for presetting a reference voltage corresponding to a predetermined rated weight of the liquid in the measuring vessel, said reference voltage being fed to the second input of the voltage comparator.

2. A device according to claim 1, comprising means for the automatic control of the switch-on timing and of the delivery direction of the pump by means of the control mechanism.

3. A device according to claim 1, comprising a control-and-safety valve actuated by the delivery pressure of the pump each, inserted between each delivery aperture and the connecting line emerging therefrom and arresting the pump upon cessation of the liquid delivery in the connecting line connected with the suction-end of the pump.

4. A device according to claim 3, wherein each of the control-and-safety valves comprises a valve housing with a stepped-down axial bore, one extremity of this bore being connected with the delivery aperture of the pump, the other extremity of the bore being connected with the associated connecting line, an annular stop formed by a narrowed section of said bore, an outer tubular valve body axially slidable in said bore, a pressure spring loading said outer valve body in the direction of said stop, an inner valve body slidable in an axial bore of the outer valve body and having an essentially hollowcylindrical shape and presenting at its extremity facing the delivery aperture a cap with an aperture for the passage of air and in the vicinity of the cap radial overflow apertures opposite each other, a taphole in said valve housing extending in transverse relation to the axial bore of the valve housing, a connecting fitting screwed in said taphole, a pipe attached to said connecting fitting in coaxial relation to same and protruding into the axial bore of the valve housing, said pipe forming a stop for the cap of said inner valve body, the portion of the axial bore of the valve housing located between said valve bodies and the delivery aperture being connected through said pipe and a line emerging from the connecting fitting with a liquid-pressure switch arresting the pump if and when the liquid pressure drops below a predetermined level.

5. A device according to claim 4, wherein the control mechanism comprises means for the delayed arresting of the pump by said liquid-pressure switches.

6. A device according to claim 5, wherein a branch pipe branching off the connecting line leading to the measuring vessel and controlled by means of a solenoid valve and terminating in said measuring vessel at a point above the liquid level, and is opened during the period of delay between the response of one of the liquid-pressure switches and the stoppage of the pump.

* * * * *